Aug. 23, 1938.  W. F. GAKLE  2,128,086
WELDING TRANSFORMER
Filed Feb. 27, 1936
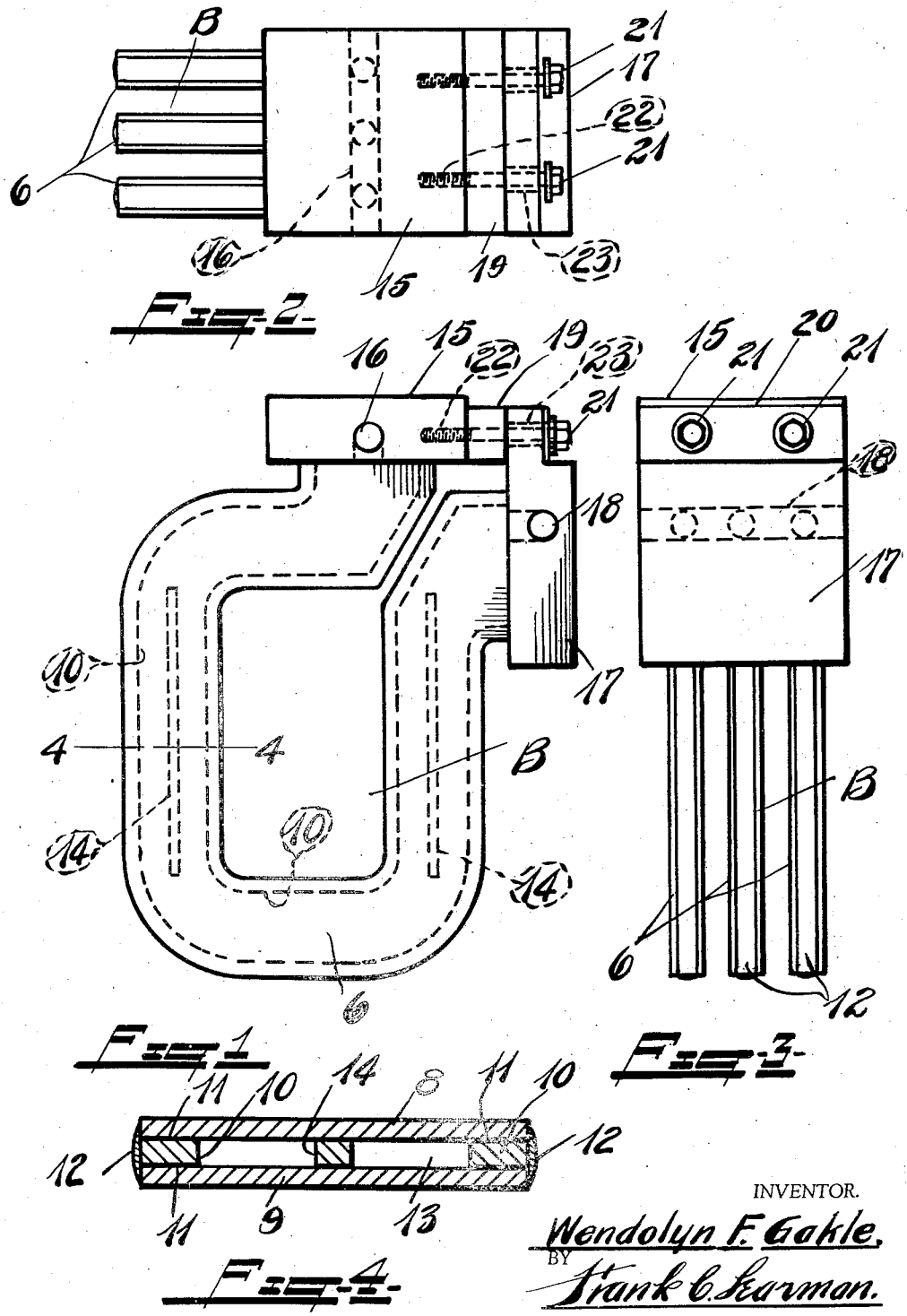
INVENTOR.
Wendolyn F. Gakle,
BY Frank C. Leaman.
ATTORNEY.

Patented Aug. 23, 1938

2,128,086

UNITED STATES PATENT OFFICE 2,128,086

WELDING TRANSFORMER

Wendolyn F. Gakle, Bay City, Mich., assignor to Kuhlman Electric Company, Bay City, Mich., a corporation of Michigan Application February 27, 1936, Serial No. 66,029

3 Claims. (Cl. 175—362)

This invention relates to transformers for electric welding systems in which the "work" is accomplished by shorting the secondaries through the weld.

In welding transformers the momentary current flow is extremely high, and the secondary of such transformers may deliver up to 100,000 amperes. This high current would obviously require a heavy cross section to satisfactorily carry the load, and suggests a bulky transformer of considerable weight which would be entirely unsatisfactory due to the fact that in welding machines in general, available space for mounting and installing large transformers is limited; therefore, it has become common practice to water-cool the secondaries to reduce the size thereof. This water cooling, however, has not been very efficient due to improper construction, and the transformer still has not been entirely satisfactory.

It is, therefore, one of the prime objects of the invention to design a transformer which can be efficiently and effectively cooled, which will be relatively small in size and light in weight for a given output, which will not clog, and which can be easily and economically manufactured and assembled.

Another object is to design a transformer, the secondaries of which are brazed or welded to a header to provide a unitary structure which can be rigidly and securely clamped in position, which readily lends itself to a free and easy circulation of the cooling agent, and which will not be loosened or shifted by repeated impacts occasioned by the welding operation.

A further object is to provide a unitary secondary structure having a relatively thin wall section with large passages and/or channels to accommodate the cooling agent.

With the above and other objects in view, the present invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit, or sacrificing any of the advantages of the invention.

In the drawing—

Fig. 1 is a side elevational view of the unitary secondary turn.

Fig. 2 is a top plan view.

Fig. 3 is an edge view.

Fig. 4 is an enlarged section detail taken on the line 4—4 of Fig. 1.

Referring now more particularly to the drawing, the ordinal "B" indicates the secondary of the transformer which comprises a plurality of legs or turns 6 which are punched from copper plates and formed as clearly shown in Fig. 4 of the drawing, these plates 8 and 9 being spaced apart by means of relatively wide copper strips or spacers 10 positioned between the plates at the outer and inner marginal edges thereof, and these members are then securely brazed or welded together along the edges 11, the outer edges being further brazed as indicated at 12, providing a water chamber 13 between the plates, additional center supports or spacers 14 being interposed to reinforce the side walls.

One end of each of these secondary assemblies is then brazed to a header 15 which serves as a secondary terminal, and a horizontally disposed passage 16 is provided in said terminal and is open to the water chambers 13 so that free circulation is assured.

A similar header 17 is brazed to the opposite ends of the secondary turns, and a water passage 18 is provided therein, said passage communicating with the water spaces 13 and serving as an outlet. This provides for a large water passage with no restricted areas or passages, the liquid circulates freely and without obstruction, and the walls of the secondary are thin and even, thus insuring efficient cooling.

In order to secure a rigid structure and prevent the ends of the legs from bending and setting up strains and stresses which eventually might cause leaks, I tie the headers 15 and 17 together, insulating them from each other by means of the insulating bar 19 which is interposed between the edge of the header 15 and the bottom face of the header 17, one end of the header 17 being shouldered as shown at 20 to accommodate the heads of the bolts 21 which project through the shouldered portion of the header and the insulating bar, and thence being threaded into threaded openings 22 provided in the header 15, insulating sleeves 23 being provided in the shouldered end of the header 17 so that proper insulation is assured.

Experience has proven that welding transformers must be securely clamped to hold the primary and secondary windings from shifting due to the repeated impacts occasioned by the welding operation, and inasmuch as these secondaries are stamped from solid sheets, a far more rugged structure, which readily withstands the dislodging stresses, is secured.

Naturally, the full load amperes must pass through the joints between the inlet and the outlet terminals respectively; these joints are of substantial area, and this is advantageous, as it is desirable to provide as much surface contact as possible so as to reduce the amperes per square inch.

It will also be understood that the width of the stamping can be increased at the point where it is brazed to the terminal, without additional cost or labor, which is impossible where the secondary is composed of a plurality of small parts.

From the foregoing description, it will be obvious that I have perfected a very simple, practical, efficient, and inexpensive secondary for welding transformers.

What I claim is:

1. In a transformer of the class described and comprising a plurality of hollow secondary legs rigidly secured together in spaced apart relation, each leg comprising a pair of stamped plates, relatively wide strips interposed between said plates at the edges to hold them in spaced apart relation, means for securing the plates and strips together to form a rigid leakproof leg construction, and a spacer strip of the same thickness as the edge spacer strips mounted in said leg to reinforce said plates.

2. In a transformer subject to intermittent and large ampere loads, a plurality of secondaries secured together in spaced apart relation, each secondary comprising a pair of stamped plates, strips interposed between said plates at the marginal edges thereof and bonded leakproof to form a cooling chamber, and means interposed between said plates for reinforcing the side walls thereof.

3. In a transformer subject to intermittent and large ampere loads, a plurality of secondaries secured together in spaced apart relation, each secondary comprising a pair of stamped plates, strips interposed between said plates at the marginal edges thereof and bonded leakproof to form a cooling chamber, headers on the ends of the secondaries, passages in said headers in communication with said chambers, an insulating bar interposed between the headers, and means for securing the headers and insulating bar in rigid assembled relation.

WENDOLYN F. GAKLE.